United States Patent [19]

Serizawa et al.

[11] Patent Number: 5,252,679

[45] Date of Patent: * Oct. 12, 1993

[54] POLYARYLENE SULFIDE RESIN COMPOSITION

[75] Inventors: Hajime Serizawa; Hiroyuki Sano; Masaru Kubota; Katsumi Uota; Toshifumi Nonaka, all of Shizuoka, Japan

[73] Assignee: Polyplastics Co., Ltd., Osaka, Japan

[*] Notice: The portion of the term of this patent subsequent to Sep. 22, 2009 has been disclaimed.

[21] Appl. No.: 623,028

[22] Filed: Dec. 6, 1990

[30] Foreign Application Priority Data

Dec. 7, 1989 [JP] Japan ............................ 1-320140
Feb. 23, 1990 [JP] Japan ............................ 2-44140

[51] Int. Cl.$^5$ ............................................ C08F 283/04
[52] U.S. Cl. .................................... 525/420; 525/537
[58] Field of Search ............................... 525/420, 537

[56] References Cited

U.S. PATENT DOCUMENTS

| 4,528,335 | 7/1985 | Selby et al. | 525/420 |
| 4,528,346 | 7/1985 | Sugie et al. | 525/523 |
| 4,917,957 | 4/1990 | Nitoh et al. | 428/447 |

FOREIGN PATENT DOCUMENTS

| 0286257 | 3/1988 | European Pat. Off. |
| 3189458 | 8/1988 | Japan . |
| 3062852 | 3/1991 | Japan . |
| 8603214 | 6/1986 | PCT Int'l Appl. . |

Primary Examiner—Melvyn I. Marquis
Assistant Examiner—Helen F. Lee
Attorney, Agent, or Firm—Depaoli & O'Brien

[57] ABSTRACT

A polyarylene sulfide composition comprises (A) 99 to 20 parts by weight of polyarylene sulfide, (B) 1 to 80 parts by weight of a polyamide and (C) 0.01 to 5 parts by weight, based on 100 parts by weight of (A) and (B) in total, of an alkoxysilane. It may further comprise (D) up to 400 parts by weight of a filler in the form of fiber, particles or plates. It can be produced by blending (A), (B), (C) and (D) with one another and melt-kneading the blend for at least 30 seconds while heated.

11 Claims, No Drawings

POLYARYLENE SULFIDE RESIN COMPOSITION

BACKGROUND OF THE INVENTION

The present invention relates to an improved polyarylene sulfide resin composition and a process for producing the same.

In particular, the present invention relates to a polyarylene sulfide resin composition having improved impact resistance and ductility and an excellent surface appearance of the surface of its molding, and a process for producing the same.

Recently a flame-retardant thermoplastic resin having high thermal resistance and chemical resistance has been required as a material for the production of components of electric and electronic appliances and the parts of automobiles and chemical apparatus.

Polyarylene sulfide resins represented by polyphenylene sulfide are among the resins satisfying the above requirements. The demand for polyarylene sulfide resins is expanding, since such resins have good properties for the cost thereof.

However, polyarylene sulfide resins have a serious defect in that such resins have a low ductility and are brittle. It is known that the properties required of engineering plastics, such as strength, rigidity, tenacity and thermal resistance, can be remarkably improved by incorporating a fibrous reinforcing material such as a glass fiber or carbon fiber into the resins.

However, even after incorporation thereinto of fibrous reinforcing material, polyarylene sulfide resins are more brittle than other engineering plastics such as nylon or polyacetal. Thus, the use of polyarylene sulfide resins for various purposes is limited because of the insufficient tenacity, even though such resins have excellent properties.

To solve this problem, the following processes have heretofore been proposed:

(1) a process wherein an α-olefin copolymer which was graft-copolymerized with 10% by weight or less of an unsaturated carboxylic acid or its anhydride and an epoxy resin are incorporated thereinto (see Japanese Patent Laid-Open No. 207921/1984), (2) a process wherein an olefinic copolymer comprising an α-olefin and a glycidyl ester of an α,β-unsaturated acid is incorporated thereinto (see Japanese Patent Laid-Open No. 189166/1984), and (3) a process wherein a polyamide resin and an epoxy resin are incorporated thereinto (see Japanese Patent Laid-Open No. 155462/1984).

However, these processes are still insufficient, since they each have problems.

In the above-described processes (1) and (2), the polyarylene sulfide resin is combined with an olefinic copolymer having an ester bond to improve the tenacity. However, according to the follow-up tests of the inventors, the olefinic copolymer is decomposed in the molding step to make the tenacity of the molding insufficient, since the molding temperature of the polyarylene sulfide resin is as high as 300° to 320° C.

According to the same tests, the above-described process (3) is practically unsatisfactory, since bleeding is observed on the surface of the molding, the state of the surface is bad and the melt flow stability of the composition is quite low.

SUMMARY OF THE INVENTION

A polyarylene sulfide composition comprises (A) 99 to 20 parts by weight of polyarylene sulfide, (B) 1 to 80 parts by weight of a polyamide and (C) 0.01 to 5 parts by weight, based on 100 parts by weight of (A) and (B) in total, of an alkoxysilane. It may further comprise (D) up to 400 parts by weight of a filler in the form of fiber, particles or plates. It can be produced by blending (A), (B), (C) and (D) with one another and melt-kneading the blend for at least 30 seconds while heated.

The composition of the invention includes two embodiments. The embodiment (1) comprises (A) 97 to 20 parts by weight of polyarylene sulfide, (B) 3 to 80 parts by weight of a polyamide and (C) 0.01 to 5 parts by weight, based on 100 parts by weight of (A) and (B) in total, of an alkoxysilane selected from the group consisting of alkoxysilanes, epoxyalkoxysilanes, aminoalkoxysilanes and mercaptoalkoxysilanes.

The embodiment (2) comprises (A) 99 to 20 parts by weight of polyarylene sulfide, (B) 1 to 80 parts by weight of a polyamide elastomer, (B') up to 79 parts by weight of a polyamide and (C) 0.01 to 5 parts by weight, based on 100 parts by weight of (A), (B) and (B') in total, of an alkoxysilane. The alkoxysilane of the embodiment (2) is preferably selected from vinylalkoxysilanes, epoxyalkoxysilanes, aminoalkoxysilanes, mercaptoalkoxysilanes and arylalkoxysilanes.

The invention will be described below in reference to the two embodiments.

DETAILED DESCRIPTION OF THE INVENTION

After intensive investigations made for the purpose of improving the tenacity of the polyarylene sulfide resin composition and the appearance of the surface of the molding, the inventors have noted reactive terminals of a polyarylene sulfide and a polyamide resin having a high tenacity. The inventors made further investigations for the purpose of finding a reactive substance which reacts with both resins under such conditions that the main chain thereof is not cleaved. As the result the inventors have found that when a silane compound having an alkoxyl group in the molecule is kneaded with the polyarylene sulfide resin and a polyamide resin at a specified temperature for a specified time, a practicable usable molding material having a remarkably high tenacity and capable of forming a molding having an excellent surface appearance can be provided. The present invention has been completed on the basis of this finding.

Thus the first embodiment of the present invention provides a polyarylene sulfide resin composition characterized by comprising 100 parts by weight in total of the following resin components:

(A) 97 to 20 parts by weight of a polyarylene sulfide resin and (B) 3 to 80 parts by weight of a polyamide resin and (C) 0.01 to 5 parts by weight of at least one silane compound selected from the group consisting of alkoxysilanes, epoxyalkoxysilanes, aminoalkoxysilanes and mercaptoalkoxysilanes and (D) 0 to 400 parts by weight of a filler selected from among fibrous fillers, particulate fillers and platy fillers or a mixture thereof, and a process for producing the above-described polyarylene sulfide resin composition characterized in that the components (A), (B) and (C) and, if desired, component (D) are melt-kneaded together under heating for at least 30 seconds.

The polyarylene sulfide resin used as the component (A) of the composition of the present invention mainly comprises recurring units -(-Ar-S-)-wherein Ar represents an arylene group.

The arylene groups (—Ar—) include

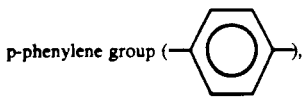

p-phenylene group

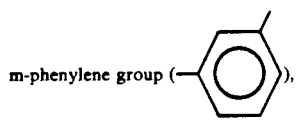

m-phenylene group

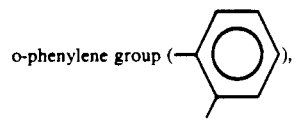

o-phenylene group

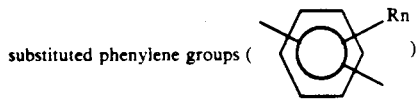

substituted phenylene groups wherein R represents an alkyl group, preferably a $C_1$ to $C_5$ alkyl group, or a phenyl group and n represents an interger of 1 to 4, p,p'-diphenylene sulfone group

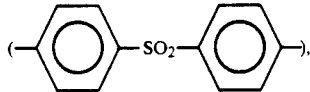

p,p'-biphenylene group

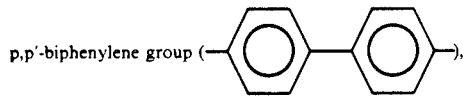

p,p'-diphenylene ether group

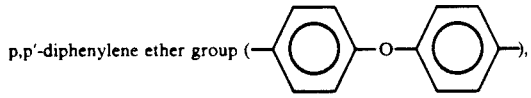

p,p'-diphenylenecarbonyl group

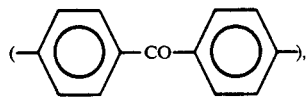

and

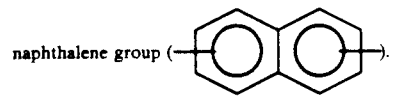

naphthalene group

A polymer comprising only one kind of the recurring units selected from among the arylene sulfide groups having the above-described arylene groups, namely a homopolymer, is usable and a copolymer comprising two or more kinds of the recurring units is sometimes preferred from the viewpoint of the processability of the composition.

As the homopolymer, a substantially linear homopolymer comprising a p-phenylene sulfide group as the recurring unit, wherein the arylene group is a p-phenylene group, is particularly preferred.

For forming the copolymer, a combination of two or more kinds of the arylene sulfide groups comprising the above-described arylene groups can be used. Among them, a combination comprising a p-phenylene sulfide group with a m-phenylene sulfide group is particularly preferred. Among them, substantially linear copolymers comprising at least 50 molar %, preferably at least 60 molar % and still preferably at least 70 molar %, of p-phenylene sulfide groups are suitable from the viewpoint of the properties such as thermal resistance, moldability and mechanical properties.

The amount of the m-phenylene sulfide group is 5 to 50 molar %, particularly 10 to 25 molar %.

As for the arrangement of the recurring units, a block arrangement (as described in, for example, Japanese Patent Laid-Open No. 14228/1986) is better than a random arrangement with respect to the thermal resistance and mechanical properties, and is preferably usable, though the workability is almost equal in both cases.

As the polyarylene sulfide resin used as the component (A) in the present invention, a polymer having an increased melt viscosity and an improved moldability produced by curing by oxidative cross-linking or thermal cross-linking of the above-described polymer is usable and also a polymer having a substantially linear structure obtained by polycondensation of monomers mainly comprising a bifunctional monomer is usable. The properties of the molding prepared from the latter polymer having a substantially linear structure are usually better than those prepared from the former polymer.

As the polyarylene sulfide resin of the present invention, a blended resin prepared by blending the above-described linear polymer with a cross-linked polyarylene sulfide resin which is in gel form when it is melted and which is produced by polymerizing a monomer having three or more functional groups with other monomers is preferably usable in addition to the above-described polymers.

The polyamide resins (B) used in the present invention include various known ones such as polyamide resins produced by the polycondensation of a dicarboxylic acid, e.g. oxalic, adipic, suberic, sebacic, terephthalic, isophthalic or 1,4-cyclohexyldicarboxylic acid with a diamine, e.g. ethylenediamine, pentamethylenediamine, hexamethylenediamine, decamethylenediamine, 1,4-cyclohexyldiamine or m-xylylenediamine; polyamide resins produced by the polymerization of a cyclic lactam, e.g. caprolactam or laurolactam; or polyamide resins obtained by copolymerizing a cyclic lactam with a salt of a dicarboxylic acid with a diamine. Among these polyamide resins, preferred are nylon 6, nylon 66, nylon 6.10, nylon 66/6.10, nylon 6/66, nylon 12, etc. Among them, nylon 6 and nylon 66 are preferred. The polyamide resin to be used preferably has a water content below a predetermined limit and, therefore, it is desirably dried prior to use.

The amount of the polyamide resin (B) used in the present invention is 3 to 80% by weight based on the total of the components (A) and (B). When the amount of component (B) is insufficient, the effect of improving the tenacity is unsatisfactory and, on the contrary, when it is excess, the advantage of the polyarylene sulfide resin (A) is impaired.

The components (C) usable in the present invention include vinylalkoxysilanes, epoxyalkoxysilanes, aminoalkoxysilanes and mercaptoalkoxysilanes. They may be used either singly or incombination of two or more of them. The vinylalkoxysilanes include vinyltriethoxysilane, vinyltrimethoxysilane and vinyltris (β-methoxyethoxy) silane.

The epoxyalkoxysilanes include γ-glycidoxypropyltrimethoxysilane, β-(3,4-epoxycyclohexyl)ethyltrimethoxysilane and γ-glycidoxypropyltriethoxysilane.

The aminoalkoxysilanes include γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane and N-phenyl-γ-aminopropyltrimethoxysilane.

The mercaptoalkoxysilanes include γ-mercaptopropyltrimethoxysilane and γ-mercaptopropyltriethoxysilane.

The amount of the alkoxysilane compound used as the component (C) is 0.01 to 5 parts by weight, preferably 0.5 to 3 parts by weight, for 100 parts by weight of the total of the polyarylene sulfide resin [component (A)] and polyamide resin [component (B)].

The amount of the alkoxysilane compound added varies depending on the kind thereof and the intended use of the composition. When it is insufficient, the effect of improving the tenacity is insufficient and, on the contrary, when it is excess, the melt viscosity is increased excessively to cause defects in the molding operation.

Although the filler used as the component (D) is not always indispensable, it is preferably used in order to give a molding having excellent properties such as mechanical strengths, thermal resistance, dimensional stability and electrical properties. Fibrous, particulate or platy filler is used depending on the use.

The fibrous fillers include inorganic fibrous substances such as glass, asbestos, carbon, silica, silica/alumina, zirconia, boron nitride, silicon nitride, boron and potassium titanate fibers, and metallic fibers such as stainless steel, aluminum, titanium, copper and brass fibers. Among them, a typical fibrous filler is glass fiber or carbon fiber. Furthermore high-melting organic fibrous substances such as polyamide, fluororesin and acrylic resin are also usable.

The particulate fillers include carbon black, silica, quartz powder, glass beads, glass powder, silicates such as calcium silicate, aluminum silicate, kaolin, talc, clay, diatomaceous earth and wollastonite, metal oxides such as iron oxide, titanium oxide and alumina, metal carbonates such as calcium carbonate and magnesium carbonate, metal sulfates such as calcium sulfate and barium sulfate, silicon carbide, silicon nitride, boron nitride and various metal powders.

The platy fillers include mica, glass flakes and various metal foils.

These inorganic fillers may be used either singly or in combination of two or more. The combination of the fibrous filler, particularly glass fiber or carbon fiber, with the particulate or platy filler is particularly preferred for obtaining excellent mechanical strengths, dimensional accuracy and electrical properties.

The composition of the present invention can be produced by various known processes. It is indispensable, however, that at least the three components (A), (B), and (C) are kneaded together in a molten state for at least 30 sec. In particular, for example, components (A), (B) and (C) and, if necessary, component (D) and other components are homogeneously mixed with a mixer such as a tumbler or Henschel mixer before the mixture is fed into a single-screw or twin-screw extruder and melt-kneaded to form pellets. In this step, preferably a part or the whole of components (A) and (B) are pulverized, a part of the resin is first homogeneously mixed with component (C) in a blender and the obtained mixture is further mixed with the rest and melted. Component (D) may be added during or after the melting step.

The treatment temperature is higher than the melting point of the resin components by 5° to 100° C., particularly preferably by 10° to 60° C. An excessively high temperature causes decomposition and unfavorable abnormal reactions.

The treatment time which varies depending on the treatment temperature and the kind and amount of the silane compound ranges from 30 sec to 15 min, preferably 1 to 10 min.

Although a detailed mechanism of the effect of the alkoxysilane compound of the present invention has not yet been fully elucidated, it is believed that the polyarylene sulfide molecule is bonded to the polyamide molecule by means of the silane compound to improve the compatibility of the components (A) and (B) with each other. This mechanism was confirmed by electron-microscopic observation of the cross-section of the molding prepared from the composition.

The composition of the present invention may contain antioxidant, thermal stabilizer, lubricant, nucleating agent, ultraviolet absorber, colorant, releasing agent and other ordinary additives so far as the object of the present invention is not inhibited.

These additives can be incorporated into the resin composition during the above-described melt kneading treatment or in any other step.

The polyarylene sulfide resin composition of the present invention has the following effects:

(1) the molding produced from the composition has remarkably improved mechanical properties such as tensile elongation and impact resistance, (2) the mechanical properties are well-balanced with the thermal resistance, (3) the molding has an excellent appearance, and (4) the resin composition can be produced at a low cost, since the additives are inexpensive and can be easily extrusion-kneaded.

The second embodiment of the invention provides a polyarylene sulfide composition comprising 100 parts by weight in total of the following resin components:

(A) 99 to 20 parts by weight of a polyarylene sulfide resin, (B) 1 to 80 parts by weight of a polyamide elastomer resin and (B') 0 to 79 parts by weight of a polyamide resin, and (C) 0.01 to 5 parts by weight of an alkoxysilane and (D) 0 to 400 parts by weight of a filler selected from among fibrous fillers, particulate fillers and platy fillers or a mixture thereof, and a process for producing the above-described polyarylene sulfide resin composition characterized in that the components (A), (B) and (C) and, if desired, components (B') and (D) are melt-kneaded together under heating for at least 30 seconds.

The polyarylene sulfide resin used as component (A) of the composition of this second embodiment of the present invention mainly comprises recurring units $+Ar+S$ wherein Ar represents an arylene group as described above.

The polyamide elastomer resin used as the component (B) in the present invention is a polyamide block copolymer comprising a polyamide hard segment and another soft segment and having a Young's modulus in flexure of 10,000 kgf/cm$^2$ (50% relative humidity, 23° C.) or less. Typical examples of the soft segments of the elastomer include polyalkylene oxides, particularly those having a molecular weight of 400 to 60,000 and 2 to 6 carbon atoms in the alkylene group. Various processes have been reported for the synthesis of such a polyamide elastomer. Usually a process comprising two steps, i.e. a step of forming a nylon oligomer and a step of polymerization by esterification is employed.

The polyamide components herein usable as the hard segment include polyamide 6, polyamide 66, polyamide 6.12, polyamide 11 and polyamide 12. Polyether components herein usable as the soft segment include polyoxyethylene glycol, polyoxypropylene glycol and polyoxytetramethylene glycol.

The polyamide elastomer resin (B) used preferably has a water content below a predetermined limit and is desirably dried prior to the use.

The amount of the polyamide elastomer resin (B) used varies depending on the use thereof. Preferably it is added in amounts of 1 to 80 parts by weight for 99 to 20 parts by weight of the polyarylene sulfide resin. Still preferably it is provided in amounts of 5 to 80 parts by weight for 95 to 20 parts by weight of the polyarylene sulfide resin. When it is less than 1 part by weight, no sufficient effect of improving the tenacity of the resin composition can be obtained.

A polyamide resin (B') can be used in combination with the polyamide elastomer resin (B), though the former is not indispensable in the present invention. The polyamide resin (B') is a polyamide having a Young's modulus in flexure of at least 10,000 kgf/cm$^2$ (50% relative humidity, 23° C.). It has a high affinity for the polyamide elastomer, it regulates the mechanical properties, particularly, elasticity, of the whole composition and it is more inexpensive than the polyamide elastomer resin. Therefore, it is preferably used for forming a molding having excellent mechanical strengths and thermal resistance at a low cost. However, an excess amount thereof is not preferred, since it impairs the hygroscopicity.

The polyamide resin (B') includes the polyamide (B) of the first embodiment.

The present invention is characterized in that the alkoxysilane compound (C) is used in combination with the above-described resin components.

The alkoxysilanes (C) usable in the present invention include vinylalkoxysilanes, epoxyalkoxysilanes, aminoalkoxysilanes, mercaptoalkoxysilanes and allylalkoxysilanes. They may be used either singly or in combination of two or more thereof.

The vinylalkoxysilanes include vinyltriethoxysilane, vinyltrimethoxysilane and vinyltris ($\beta$-methoxyethoxy) silane.

The epoxyalkoxysilanes include $\gamma$-glycidoxypropyltrimethoxysilane, $\beta$-(3,4-epoxycyclohexyl)ethyltrimethoxysilane and $\gamma$-glycidoxypropyltriethoxy silane.

The aminoalkoxysilanes include $\gamma$-aminopropyltrimethoxysilane, $\gamma$-aminopropyltriethoxysilane, $\gamma$-aminopropylmethyldimethoxysilane, $\gamma$-aminopropylmethyldiethoxysilane, N-($\beta$-aminoethyl)-$\gamma$-aminopropyltrimethoxysilane and N-phenyl-$\gamma$-aminopropyltrimethoxysilane.

The mercaptoalkoxysilanes include $\gamma$-mercaptopropyltrimethoxysilane and $\gamma$-mercaptopropyltriethoxysilane.

The allylalkoxysilanes include $\gamma$-diallylaminopropyltrimethoxysilane, $\gamma$-allylaminopropyltrimethoxysilane and $\gamma$-allylthiopropyltrimethoxysilane.

The amount of the alkoxysilane compound used as the component (C) is 0.01 to 5 parts by weight, preferably 0.1 to 3 parts by weight, for 100 parts by weight of the total of the polyarylene sulfide resin [component (A)], polyamide elastomer resin [component (B)] and polyamide resin [component (B')].

The amount of the alkoxysilane compound added varies depending on the kind thereof and the intended use of the composition. When it is insufficient, the effect of improving the tenacity is insufficient and, on the contrary, when it is excess, the melt viscosity is increased excessively to cause defects in the molding operation.

The amount of the inorganic filler is not larger than 400 parts by weight for 100 parts by weight of the total of the resin components (A), (B), (B') (B'). When the amount exceeds 400 parts by weight, the moldability and tenacity are impaired unfavorably. It is particularly preferably not larger than 250 parts by weight.

The composition of the present invention can be produced by various known processes. It is indispensable, however, that at least the three components (A), (B) and (C) and, if necessary, component (B') are kneaded together in a molten state for at least 30 sec. In particular, for example, components. (A), (B), (C) and (B') and, if necessary, component (D) and other components are homogeneously mixed with a mixer such as a tumbler or a Henschel mixer before the mixture is fed into a single-screw or twin-screw extruder and melt-kneaded to form pellets. In this step, preferably a part or the whole of the components (A), (B) and (B') are pulverized, a part of the resin is first homogeneously mixed with component (C) in a blender and the obtained mixture is further mixed with the rest and melted. Component (D) may be added during or after the melting step. It is particularly preferred to add component (D) after the polymeric components have been melt-kneaded and reacted with component (C) in order to obtain a remarkable effect of improving the tenacity.

The treatment temperature is higher than the melting point of the resin components by 5° to 100° C., particularly preferably by 10° to 60° C. An excessively high temperature causes decomposition and abnormal reactions unfavorably.

The melt treatment time which varies depending on the treatment temperature and the kind and amount of the silane compound ranges from 30 sec to 15 min, preferably 1 to 10 min.

Although a detailed mechanism of the effect of the alkoxysilane compound of the present invention has not yet been fully elucidated, it is supposed that the polyarylene sulfide molecule is bonded to the polyamide polymeric molecule by means of the silane compound to improve the compatibility of the components (A), (B) and (B') with one another. This mechanism was confirmed by the fact that the viscosity is increased by the melting treatment conducted in the presence of component (C) and also by electron-microscopic observation of the cross-sectional phase structure of the molding prepared from the composition. According to the process of the present invention, the polyamide resin can be dispersed in the form of minute particles (1 μm or less), while it is dispersed in the form of very coarse particles (10 μm or more) in the absence of the silane compound (C).

It will be apparent from the above description and the following Examples that the resin components are quite finely dispersed in the polyarylene sulfide resin composition of the present invention and that the composition has the following effects:

(1) the molding produced from the composition has remarkably improved mechanical properties such as tensile elongation and impact resistance, (2) the mechanical properties are well-balanced with the thermal resistance, and (3) the molding has an excellent appearance.

EXAMPLES

The following Examples further illustrate the present invention, and should by no means be considered as limiting the invention.

EXAMPLES 1 TO 5 AND COMPARATIVE EXAMPLES 1 AND 2

40 parts by weight of nylon 66 were added to 60 parts by weight of a polyphenylene sulfide polymer (m.p.: 285° C., melt viscosity determined at a shear rate of 1200 sec$^{-1}$ at 310°: about 500 P). Further γ-aminopropyltriethoxysilane and, if necessary, a glass fiber (chopped strands having a diameter of 10 μm and a length of 3 mm) in amounts specified in Table 1 were added thereto. They were premixed with a Henschel mixer for 5 min. The mixture was melt-kneaded with an extruder at a cylinder temperature of 310° C. to prepare pellets of the polyphenylene sulfide resin composition.

Then the pellets were shaped into ASTM test pieces with an injection molding machine at a cylinder temperature of 310° C. and mold temperature of 150° C. The test pieces were subjected to tensile, impact and heat distortion tests. The appearance of the surface of the molding was macroscopically evaluated. The results are summarized in Table 1.

EXAMPLES 6 TO 9 AND COMPARATIVE EXAMPLES 3 AND 4

Nylon 66 was added to the same polyphenylene sulfide polymer as that used in the above-described Examples and Comparative Examples in a ratio specified in Table 2. Further γ-aminopropyltriethoxysilane and glass fiber in a ratio specified in Table 2 were added thereto and the same procedure as that of Examples 1 to 5 was repeated.

The results are given in Table 2.

EXAMPLES 10 AND 11 AND COMPARATIVE EXAMPLES 5 AND 6

40 parts by weight of nylon 6 were added to 60 parts by weight of the same polyphenylene sulfide polymer as that described above. Then aminopropyltriethoxysilane and glass fiber in amounts specified in Table 3 were added thereto. Then the same procedure as that of Examples 1 to 5 was repeated.

The results are given in Table 3.

EXAMPLES 12 AND 13 AND COMPARATIVE EXAMPLES 7 AND 8

40 parts by weight of nylon 12 were added to 60 parts by weight of the same polyphenylene sulfide polymer as that used in the above-described Examples. Then γ-aminopropyltriethoxysilane and glass fiber in amounts specified in Table 4 were added thereto. The same procedure as that of Examples 1 to 5 was repeated.

The results are given in Table 4.

EXAMPLES 14 AND 15

40 parts by weight of nylon 66 were added to 60 parts by weight of the same polyphenylene sulfide polymer as that used in the above-described examples. Then γ-glycidoxypropyltrimethoxysilane and glass fiber in amounts specified in Table 5 were added thereto. The same procedure as that of Examples 1 to 5 was repeated.

The results are given in Table 5 together with those of Comparative Examples 1 and 2.

EXAMPLES 16 AND 17

The same procedure as that of Examples 14 and 15 was repeated except that γ-glycidoxypropyltrimethoxysilane was replaced with γ-mercaptopropyltrimethoxysilane in amounts specified in Table 6.

The results are given in Table 6 together with those of Comparative Examples 1 and 2.

EXAMPLES 18 AND 19

The same procedure as that of Examples 14 and 15 was repeated except that γ-glycidoxypropyltrimethoxysilane was replaced with vinyltrimethoxysilane in amounts specified in Table 7.

The results are given in Table 7 together with those of Comparative Examples 1 and 2.

TABLE 1

|  | Comp. Ex. 1 | Ex. 1 | Ex. 2 | Ex. 3 | Ex. 4 | Comp. Ex. 2 | Ex. 5 |
|---|---|---|---|---|---|---|---|
| Proportion (parts by weight) | | | | | | | |
| polyphenylene sulfide resin | 60 | 60 | 60 | 60 | 60 | 60 | 60 |
| nylon 66 resin | 40 | 40 | 40 | 40 | 40 | 40 | 40 |
| γ-aminpropyltriethoxysilane | — | 0.1 | 0.5 | 1.0 | 2.0 | — | 2.0 |
| glass fiber | — | — | — | — | — | 67 | 67 |
| Properties of composition | | | | | | | |
| tensile strength [kg f/cm$^2$] | 650 | 720 | 780 | 830 | 850 | 1550 | 2340 |
| tensile elongation [%] | 6 | 12 | 31 | 43 | 50 | 1.4 | 6 |
| Izod impact strength, notched [kg cm/cm] | 2.2 | 2.7 | 3.5 | 4.8 | 5.1 | 5.7 | 12.8 |
| Izod impact strength, unnotched [kg cm/cm] | 15 | 34 | 52 | 75 | 85 | 27 | 56 |

TABLE 1-continued

|  | Comp. Ex. 1 | Ex. 1 | Ex. 2 | Ex. 3 | Ex. 4 | Comp. Ex. 2 | Ex. 5 |
|---|---|---|---|---|---|---|---|
| heat distortion temperature [°C] (18.6 kg load) | 114 | 112 | 110 | 109 | 108 | 253 | 254 |
| appearance of molding | bad | good | good | good | good | bad | good |

TABLE 2

|  | Comp. Ex. 3 | Ex. 6 | Ex. 4 | Ex. 7 | Comp. Ex. 4 | Ex. 8 | Ex. 5 | Ex. 9 |
|---|---|---|---|---|---|---|---|---|
| Proportion (parts by weight) | | | | | | | | |
| polyphenylene sulfide resin | 100 | 80 | 60 | 40 | 100 | 80 | 60 | 40 |
| nylon 66 resin | — | 20 | 40 | 60 | — | 20 | 40 | 60 |
| γ-aminopropyl-triethoxysilane | 2.0 | 2.0 | 2.0 | 2.0 | 2.0 | 2.0 | 2.0 | 2.0 |
| glass fiber | — | — | — | — | 67 | 67 | 67 | 67 |
| Properties of composition | | | | | | | | |
| tensile strength [kg f/cm$^2$] | 660 | 720 | 850 | 840 | 1750 | 2020 | 2340 | 2340 |
| tensile elongation [%] | 2.4 | 34 | 50 | 62 | 1.6 | 4.1 | 6 | 7.1 |
| Izod impact strength, notched [kg cm/cm] | 1.2 | 4.2 | 5.1 | 5.8 | 9.0 | 11.1 | 12.8 | 13.0 |
| Izod impact strength, unnotched [kg cm/cm] | 7 | 68 | 85 | 97 | 30 | 43 | 56 | 60 |
| heat distortion temperature [°C] (18.6 kg load) | 116 | 114 | 108 | 95 | 260 | 256 | 254 | 251 |
| appearance of molding | good | good | good | good | good | good | good | good |

TABLE 3

|  | Comp. Ex. 5 | Ex. 10 | Comp. Ex. 6 | Ex. 11 |
|---|---|---|---|---|
| Proportion (parts by weight) | | | | |
| polyphenylene sulfide resin | 60 | 60 | 60 | 60 |
| nylon 6 resin | 40 | 40 | 40 | 40 |
| γ-aminopropyl-triethoxysilane | — | 2.0 | — | 2.0 |
| glass fiber | — | — | 67 | 67 |
| Properties of composition | | | | |
| tensile strength [kg f/cm$^2$] | 620 | 830 | 1450 | 2110 |
| tensile elongation [%] | 8 | 63 | 1.8 | 9 |
| Izod impact strength, notched [kg cm/cm] | 2.8 | 7.4 | 6.2 | 13.5 |
| Izod impact strength, unnotched [kg cm/cm] | 21 | 106 | 31 | 68 |
| heat distortion temperature [°C] (18.6 kg load) | 109 | 107 | 247 | 247 |
| appearance of molding | bad | good | bad | good |

TABLE 4

|  | Comp. Ex. 7 | Ex. 12 | Comp. Ex. 8 | Ex. 13 |
|---|---|---|---|---|
| Proportion (parts by weight) | | | | |
| polyphenylene sulfide resin | 60 | 60 | 60 | 60 |
| nylon 12 resin | 40 | 40 | 40 | 40 |
| γ-aminopropyl-triethoxysilane | — | 2.0 | — | 2.0 |
| glass fiber | — | — | 67 | 67 |
| Properties of composition | | | | |
| tensile strength [kg f/cm$^2$] | 560 | 710 | 1370 | 2000 |
| tensile elongation [%] | 3.1 | 48 | 1.4 | 7.4 |
| Izod impact strength, notched [kg cm/cm] | 1.8 | 5.3 | 5.4 | 12.1 |
| Izod impact strength, unnotched [kg cm/cm] | 15 | 71 | 28 | 53 |
| heat distortion temperature [°C] (18.6 kg load) | 82 | 80 | 237 | 236 |
| appearance of molding | bad | good | bad | good |

TABLE 5

|  | Comp. Ex. 1 | Ex. 14 | Comp. Ex. 2 | Ex. 15 |
|---|---|---|---|---|
| Proportion (parts by weight) | | | | |
| polyphenylene sulfide resin | 60 | 60 | 60 | 60 |
| nylon 66 resin | 40 | 40 | 40 | 40 |
| γ-glycidoxypropyl-trimethoxysilane | — | 2.0 | — | 2.0 |
| glass fiber | — | — | 67 | 67 |
| Properties of composition | | | | |
| tensile strength [kg f/cm$^2$] | 650 | 870 | 1550 | 2440 |
| tensile elongation [%] | 6 | 56 | 1.4 | 7.1 |
| Izod impact strength, notched [kg cm/cm] | 2.2 | 6.2 | 5.7 | 13.2 |
| Izod impact strength, unnotched [kg cm/cm] | 15 | 98 | 27 | 64 |
| heat distortion temperature [°C] (18.6 kg load) | 114 | 107 | 253 | 252 |
| appearance of molding | bad | good | bad | good |

TABLE 6

|  | Comp. Ex. 1 | Ex. 16 | Comp. Ex. 2 | Ex. 17 |
|---|---|---|---|---|
| Proportion (parts by weight) | | | | |

TABLE 6-continued

|  | Comp. Ex. 1 | Ex. 16 | Comp. Ex. 2 | Ex. 17 |
|---|---|---|---|---|
| polyphenylene sulfide resin | 60 | 60 | 60 | 60 |
| nylon 66 resin | 40 | 40 | 40 | 40 |
| γ-mercaptopropyl-trimethoxysilane | — | 2.0 | — | 2.0 |
| glass fiber | — | — | 67 | 67 |
| Properties of composition |  |  |  |  |
| tensile strength [kg f/cm$^2$] | 650 | 810 | 1550 | 2280 |
| tensile elongation [%] | 6 | 44 | 1.4 | 5.6 |
| Izod impact strength, notched [kg cm/cm] | 2.2 | 4.7 | 5.7 | 11.4 |
| Izod impact strength, unnotched [kg cm/cm] | 15 | 72 | 27 | 48 |
| heat distortion temperature [°C.] (18.6 kg load) | 114 | 109 | 253 | 255 |
| appearance of molding | bad | good | bad | good |

TABLE 7

|  | Comp. Ex. 1 | Ex. 18 | Comp. Ex. 2 | Ex. 19 |
|---|---|---|---|---|
| Proportion (parts by weight) |  |  |  |  |
| polyphenylene sulfide resin | 60 | 60 | 60 | 60 |
| nylon 66 resin | 40 | 40 | 40 | 40 |
| vinyltrimethoxy-silane | — | 2.0 | — | 2.0 |
| glass fiber | — | — | 67 | 67 |
| Properties of composition |  |  |  |  |
| tensile strength [kg f/cm$^2$] | 650 | 830 | 1550 | 2300 |
| tensile elongation [%] | 6 | 47 | 1.4 | 5.8 |
| Izod impact strength, notched [kg cm/cm] | 2.2 | 5.0 | 5.7 | 12.2 |
| Izod impact strength, unnotched [kg cm/cm] | 15 | 78 | 27 | 54 |
| heat distortion temperature [°C.] (18.6 kg load) | 114 | 108 | 253 | 254 |
| appearance of molding | bad | good | bad | good |

EXAMPLES 20 TO 24 AND COMPARATIVE EXAMPLES 9 AND 10

20 parts by weight of a polyamide elastomer (trade name: Daiamid E 62, a product of Daicel-Hüls Ltd.*) (see the following Note 1) was added to 80 parts by weight of a polyphenylene sulfide polymer (m.p.: 285° C.). Further γ-aminopropyltriethoxysilane and, if necessary, a glass fiber (chopped strands having a diameter of 10 μm and a length of 3 mm) in amounts specified in Table 8 were added thereto. They were premixed with a Henschel mixer for 5 min. The mixture was melt-kneaded with an extruder at a cylinder temperature of 310° C. to prepare pellets of the polyphenylene sulfide resin composition.

(Note 1)* a polyamide elastomer (Young's modulus in flexure: 3500 kgf/cm$^2$) comprising nylon 12 as the hard segment and polyoxybutylene as the soft segment.

Then the pellets were shaped into ASTM test pieces with an injection molding machine at a cylinder temperature of 310° C. and mold temperature of 150° C. The test pieces were subjected to tensile, impact and heat distortion tests. The appearance of the surface of the molding was macroscopically evaluated. The results are summarized in Table 8.

EXAMPLES 25 TO 28 AND COMPARATIVE EXAMPLES 11 AND 12

Daiamid E 62 was added to the same polyphenylene sulfide polymer as that used in the above-described Examples and Comparative Examples in a ratio specified in Table 9. Further γ-aminopropyltriethoxysilane and glass fiber in a ratio specified in Table 9 were added thereto and the same procedure as that of Examples 20 to 24 were repeated.

The results are given in Table 9.

EXAMPLES 29 TO 36

20 parts by weight of a polyamide elastomer (Daiamid E 62) was added to 80 parts by weight of the same polyphenylene sulfide polymer as that described above. Then γ-glycidoxypropyltrimethoxysilane, γ-mercaptopropyltrimethoxysilane, vinyltrimethoxysilane or γ-diallylaminopropyltrimethoxysilane and glass fiber in amounts specified in Table 10 were added thereto. Then the same procedure as that of Examples 20 to 24 was repeated.

The results are given in Table 10.

EXAMPLES 37 TO 41 AND COMPARATIVE EXAMPLES 13 AND 14

A polyamide elastomer (Daiamid E 62) and a polyamide (PA) 66 in amounts specified in Table 11 were added to 60 parts by weight of the same polyphenylene sulfide polymer as that described above. 2 parts by weight of γ-aminopropyltriethoxysilane and, if necessary, glass fiber in an amount specified in Table 11 were added to 100 parts by weight of the total mixture obtained as described above. Then the same procedure as that of Examples 20 to 24 repeated.

The results are given in Table 11.

EXAMPLES 42 TO 51 AND COMPARATIVE EXAMPLES 15 AND 16

20 parts by weight of a polyamide elastomer (trade name: Daiamid E 40, a product of Daicel-Hüls Ltd.*) (see the following Note 2) was added to 80 parts by weight of the above-described polyphenylene sulfide polymer. Then γ-aminopropyltriethoxysilane, γ-glycidoxypropyltrimethoxysilane, γ-mercaptopropyltrimethoxysilane, vinyltrimethoxysilane or γ-diallylaminopropyltrimethoxysilane and, if necessary, glass fiber in amounts specified in Table 12 were added thereto. Then the same procedure as that of Examples 20 to 24 were repeated. The results are given in Table 12.

(Note 1)* a polyamide elastomer (Young's modulus in flexure: 900 kgf/cm$^2$) comprising nylon 12 as the hard segment and polyoxybutylene as the soft segment.

TABLE 8

|  | Comp. Ex. 9 | Ex. 20 | Ex. 21 | Ex. 22 | Ex. 23 | Comp. Ex. 10 | Ex. 24 |
|---|---|---|---|---|---|---|---|
| Proportion (parts by weight) |  |  |  |  |  |  |  |
| polyphenylene sulfide resin | 60 | 80 | 80 | 80 | 80 | 80 | 80 |
| Daiamid E 62 | 20 | 20 | 20 | 20 | 20 | 20 | 20 |

TABLE 8-continued

|  | Comp. Ex. 9 | Ex. 20 | Ex. 21 | Ex. 22 | Ex. 23 | Comp. Ex. 10 | Ex. 24 |
|---|---|---|---|---|---|---|---|
| γ-aminopropyltriethoxysilane | — | 0.1 | 0.5 | 1.0 | 2.0 | — | 2.0 |
| glass fiber | — | — | — | — | — | 67 | 67 |
| Properties of composition |  |  |  |  |  |  |  |
| tensile strength [kgf/cm$^2$] | 680 | 712 | 728 | 741 | 750 | 1500 | 1910 |
| tensile elongation [%] | 7 | 26 | 34 | 46 | 54 | 1.5 | 3.1 |
| Izod impact strength, notched [kg cm/cm] | 2.3 | 3.1 | 4.5 | 5.6 | 6.2 | 5.5 | 10.2 |
| Izod impact strength, unnotched [kg cm/cm] | 25 | 42 | 61 | 84 | 91 | 31 | 60 |
| heat distortion termperature (18.6 kg load) [°C] | 107 | 107 | 107 | 106 | 106 | 260 | 257 |
| appearance of molding | bad | good | good | good | good | bad | good |

TABLE 9

|  | Comp. Ex. 11 | Ex. 25 | Ex. 23 | Ex. 26 | Ex. 27 | Comp. Ex. 12 | Ex. 24 | Ex. 28 |
|---|---|---|---|---|---|---|---|---|
| Proportion (parts by weight) |  |  |  |  |  |  |  |  |
| polyphenylene sulfide resin | 100 | 90 | 80 | 60 | 40 | 100 | 80 | 80 |
| Daiamid E 62 | — | 10 | 20 | 40 | 60 | — | 20 | 40 |
| γ-aminopropyltriethoxysilane | 2.0 | 2.0 | 2.0 | 2.0 | 2.0 | 2.0 | 2.0 | 2.0 |
| glass fiber | — | — | — | — | — | 67 | 67 | 67 |
| Properties of composition |  |  |  |  |  |  |  |  |
| tensile strength [kgf/cm$^2$] | 660 | 722 | 750 | 710 | 630 | 1750 | 1910 | 1800 |
| tensile elongation [%] | 2.4 | 44 | 54 | 110 | 150 | 1.5 | 3.1 | 4.0 |
| Izod impact strength, notched [kg cm/cm] | 1.2 | 4.2 | 6.2 | 10.5 | 12.0 | 8.9 | 10.2 | 16.9 |
| Izod impact strength, unnotched [kg cm/cm] | 7 | 60 | 91 | 155 | 160 | 30 | 60 | 165 |
| heat distortion termperature (18.6 kg load) [°C] | 116 107 | 106 | 91 | 80 | 260 | 257 | 253 |  |
| appearance of molding | good | good | good | good | good | good |  |  |

TABLE 10

|  | Comp. Ex. 9 | Ex. 29 | Ex. 30 | Ex. 31 | Ex. 32 | Comp. Ex. 10 | Ex. 33 | Ex. 34 | Ex. 35 | Ex. 36 |
|---|---|---|---|---|---|---|---|---|---|---|
| Proportion (parts by weight) |  |  |  |  |  |  |  |  |  |  |
| polyphenylene sulfide resin | 80 | 80 | 80 | 80 | 80 | 80 | 80 | 80 | 80 | 80 |
| Daiamid E 62 | 20 | 20 | 20 | 20 | 20 | 20 | 20 | 20 | 20 | 20 |
| γ-glycidoxypropyl-trimethoxysilane | — | 2 | — | — | — | — | 2 | — | — | — |
| γ-mercaptopropyl-trimethoxysilane | — | — | 2 | — | — | — | — | 2 | — | — |
| vinyltrimethoxysilane | — | — | — | 2 | — | — | — | — | 2 | — |
| γ-diallylaminopropyl-trimethoxysilane | — | — | — | — | 2 | — | — | — | — | 2 |
| glass fiber | — | — | — | — | — | 67 | 67 | 67 | 67 | 67 |
| Properties of composition |  |  |  |  |  |  |  |  |  |  |
| tensile strength [kgf/cm$^2$] | 680 | 740 | 720 | 720 | 745 | 1500 | 1860 | 1830 | 1840 | 1890 |
| tensile elongation [%] | 7 | 50 | 42 | 44 | 52 | 1.5 | 2.7 | 2.4 | 2.5 | 3.0 |
| Izod impact strength, notched [kg cm/cm] | 2.3 | 5.7 | 4.6 | 4.8 | 6.0 | 5.5 | 10.1 | 9.6 | 9.7 | 10.2 |
| Izod impact strength, unnotched [kg cm/cm] | 25 | 82 | 66 | 67 | 87 | 31 | 56 | 51 | 52 | 58 |
| heat distortion temperature (18.6 kg load) [°C] | 107 | 106 | 106 | 106 | 106 | 260 | 257 | 257 | 257 | 257 |
| appearance of molding | bad | good | good | good | good | bad | good | good | good | good |

TABLE 11

|  | Comp. Ex. 13 | Ex. 37 | Ex. 38 | Ex. 39 | Ex. 40 | Comp. Ex. 14 | Ex. 41 |
|---|---|---|---|---|---|---|---|
| Proportion (parts by weight) |  |  |  |  |  |  |  |
| polyphenylene sulfide resin | 60 | 60 | 60 | 60 | 60 | 60 | 60 |
| Daiamid E 62 | — | 5 | 10 | 15 | 20 | — | 10 |
| PA66 | 40 | 35 | 30 | 25 | 20 | 40 | 30 |
| γ-aminopropyltriethoxysilane | 2.0 | 2.0 | 2.0 | 2.0 | 2.0 | 2.0 | 2.0 |
| glass fiber | — | — | — | — | — | 67 | 67 |
| Properties of composition |  |  |  |  |  |  |  |
| tensile strength [kgf/cm$^2$] | 800 | 780 | 750 | 735 | 725 j | 2300 | 2100 |
| tensile elongation [%] | 50 | 63 | 72 | 85 | 98 | 5 | 10 |

TABLE 11-continued

|  | Comp. Ex. 13 | Ex. 37 | Ex. 38 | Ex. 39 | Ex. 40 | Comp. Ex. 14 | Ex. 41 |
|---|---|---|---|---|---|---|---|
| Izod impact strength, notched [kg cm/cm] | 4.9 | 6.4 | 7.2 | 8.5 | 9.7 | 12.2 | 15.0 |
| Izod impact strength, unnotched [kg cm/cm] | 81 | 110 | 133 | 144 | 150 | 51 | 151 |
| heat distortion temperature (18.6 kg load) [°C.] | 108 | 105 | 100 | 97 | 94 | 254 | 252 |
| appearance of molding | good | good | good | good | good | good | good |

TABLE 12

|  | Comp. Ex. 15 | Ex. 42 | Ex. 43 | Ex. 44 | Ex. 45 | Ex. 16 | Comp. Ex. 47 | Ex. 48 | Ex. 49 | Ex. 50 | Ex. 51 |
|---|---|---|---|---|---|---|---|---|---|---|---|
| Proportion (parts by weight) | | | | | | | | | | | |
| polyphenylene sulfide resin | 80 | 80 | 80 | 80 | 80 | 80 | 80 | 80 | 80 | 80 | 80 |
| Diamide E 40 | 20 | 20 | 20 | 20 | 20 | 20 | 20 | 20 | 20 | 20 | 20 |
| γ-aminopropyltriethoxysilane | — | 2 | — | — | — | — | — | 2 | — | — | — |
| γ-glycidoxypropyltri-methoxysilane | — | — | 2 | — | — | — | — | — | 2 | — | — |
| γ-mercaptopropyltri-methoxysilane | — | — | — | 2 | — | — | — | — | — | 2 | — |
| vinyltrimethoxysilane | — | — | — | — | 2 | — | — | — | — | — | 2 |
| γ-diallylaminopropyltri-methoxysilane | — | — | — | — | — | 2 | — | — | — | — | — |
| glass fiber | — | — | — | — | — | — | 67 | 67 | 67 | 67 | 67 |
| Properties of composition | | | | | | | | | | | |
| tensile strength [kgf/cm$^2$] | 670 | 745 | 730 | 710 | 710 | 735 | 1440 | 1870 | 1800 | 1780 | 1790 | 1830 |
| tensile elongation [%] | 7.5 | 58 | 54 | 45 | 48 | 52 | 1.6 | 3.3 | 2.8 | 2.5 | 2.7 | 3.0 |
| Izod impact strength, notched [kg cm/cm] | 2.5 | 6.6 | 6.0 | 5.0 | 5.1 | 5.8 | 5.6 | 10.5 | 10.2 | 9.8 | 9.9 | 10.4 |
| Izod impact strength, unnotched [kg cm/cm] | 28 | 96 | 86 | 70 | 71 | 84 | 33 | 63 | 58 | 53 | 54 | 60 |
| heat distortion temperature (18.6 kg load) [°C.] | 104 | 102 | 102 | 102 | 102 | 102 | 258 | 255 | 255 | 255 | 255 | 255 |
| appearance of molding | bad | good | good | good | good | good | bad | good | good | good | good | good |

We claim:

1. A polyarylene sulfide composition comprising (A) 95 to 40 parts by weight of polyarylene sulfide, (B) 5 to 60 parts by weight of a polyamide block copolymer elastomer made of polyamide hard segments and soft segments, said elastomer having a Young's flexural modulus of up to 10,000 kgf/cm$^2$ at 50% relative humidity and 23° C., (B') 0 to 35 parts by weight of a polyamide and (C) 0.01 to 5 parts by weight, based on 100 parts by weight of (A), (B) and (B') and total, of an alkoxysilane.

2. The composition as claimed in claim 1, in which the alkoxysilane is selected from the group consisting of vinylalkoxysilanes, epoxyalkoxysilanes, aminoalkoxysilanes, mercaptoalkoxysilanes and arylalkoxysilanes.

3. The composition of claim 1 wherein said polyamide elastomer (B) is a block copolymer comprising polyamide hard segments and polyalkylene oxide soft segments.

4. The composition of claim 3 wherein said polyamide hard segments are selected from nylon 6, nylon 6,6, nylon 6.12, nylon 11 and nylon 12.

5. The composition of claim 3 wherein said soft segments are polyethers selected from the group consisting of polyoxytethylene glycol, polyoxypropylene glycol and polyoxytetramethylene glycol.

6. The composition of claim 1 wherein said composition is devoid of said polyamide (B').

7. The composition of claim 1 wherein said polyarylene sulfide (A) is polyphenylene sulfide.

8. The composition of claim 1 further comprising (D) up to 400 parts by weight of a filler in the form of fiber, particles or plates.

9. The composition of claim 8 wherein said filler comprises glass fiber.

10. The composition of claim 1 wherein said composition comprises a positive amount of said polyamide (B').

11. The composition of claim 1 wherein said polyarylene sulfide (A) is present in amounts of 95 to 60 parts by weight and said polyamide block copolymer elastomer (B) is present in amounts of 5 to 40 parts by weight.

* * * * *